US009348885B2

(12) United States Patent
Modarresi

(10) Patent No.: US 9,348,885 B2
(45) Date of Patent: May 24, 2016

(54) SYSTEM AND METHOD FOR RANKING AND SELECTING DATA FEATURES

(71) Applicant: Adobe Systems Incorporated, San Jose, CA (US)

(72) Inventor: Kourosh Modarresi, Los Altos, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 205 days.

(21) Appl. No.: 14/172,607

(22) Filed: Feb. 4, 2014

(65) Prior Publication Data
US 2015/0220622 A1    Aug. 6, 2015

(51) Int. Cl.
*G06F 17/30*    (2006.01)

(52) U.S. Cl.
CPC ................. *G06F 17/30592* (2013.01)

(58) Field of Classification Search
CPC ............ G06F 17/30663; G06F 17/30592; G06F 17/30595
USPC .......................................................... 707/748
See application file for complete search history.

(56) References Cited

U.S. PATENT DOCUMENTS

| | | | | |
|---|---|---|---|---|
| 2007/0143345 A1* | 6/2007 | Jones | ................ | G06F 17/30241 |
| 2007/0236343 A1* | 10/2007 | Becksted | ......... | G08B 13/19695 340/521 |
| 2011/0173130 A1* | 7/2011 | Schaefer, IV | ...... | G06Q 30/0282 705/347 |
| 2012/0226700 A1* | 9/2012 | Chang | ................ | G06Q 30/0251 707/748 |
| 2013/0054603 A1* | 2/2013 | Birdwell | ............... | G06K 9/6224 707/738 |
| 2014/0248900 A1* | 9/2014 | Modica | ................ | G01C 21/206 455/456.1 |
| 2014/0347265 A1* | 11/2014 | Aimone | ................. | G09G 3/003 345/156 |
| 2015/0066953 A1* | 3/2015 | Krusell | ............. | G06F 17/30705 707/748 |
| 2015/0113004 A1* | 4/2015 | Despain | ............... | G06N 99/005 707/748 |
| 2015/0193528 A1* | 7/2015 | Bengio | ............. | G06F 17/30277 707/749 |

OTHER PUBLICATIONS

Moore et al., Internet Traffic Classification Using Bayesian Analysis Techniques, 2005, 11 pages.*
Slivkins et al., Ranked Bandits in Metric Spaces: Learning Diverse Rankings over Large Document Collections, 2013, 38 pages.*

* cited by examiner

*Primary Examiner* — Noosha Arjomandi
(74) *Attorney, Agent, or Firm* — Shook, Hardy & Bacon L.L.P.

(57) ABSTRACT

Example systems and methods of extracting the most informative data parameters from a set of data are provided. Large dimensionality data sets may reduced to a desired dimensionality while substantially preserving their real world interpretation so that the resultant reduced dimensionality set may still be effectively interpreted in light of a real world initial data set. The systems and method first complete the data set by filling in missing data in a manner that will not bias the resultant reduced data set. The system then selects the N most informative data parameters while minimizing reconstruction error.

20 Claims, 8 Drawing Sheets

SYSTEM AND METHOD FOR RANKING AND SELECTING DATA FEATURES

FIELD

This application relates generally to data processing and, in an example embodiment, a system that selects the most important features from a collection of data representing real world activities.

BACKGROUND

Systems today may be very complex and monitoring such systems may yield massive amounts of data of high dimension (e.g., hundreds, thousands or millions of rows and/or columns when data is represented in tabular format) representing numerous aspects of real world activities by users, system components, and so forth. Dealing with these data sets and extracting useful information to base decisions on is difficult, if not impossible. Many statistical learning algorithms and machine learning methodologies do not work properly for high dimension data. Thus, almost all techniques to deal with this type of high dimension data involve reduction in the number of dimensions through one approach or another until the dimensions are of an order sufficient to allow the application of the desired techniques. Most, if not all, of these techniques yield reduced dimensions that are not tied to the real world (e.g., the ability to interpret the resulting reduced dimensions in terms of real world activities by users, system components, and so forth is lost).

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
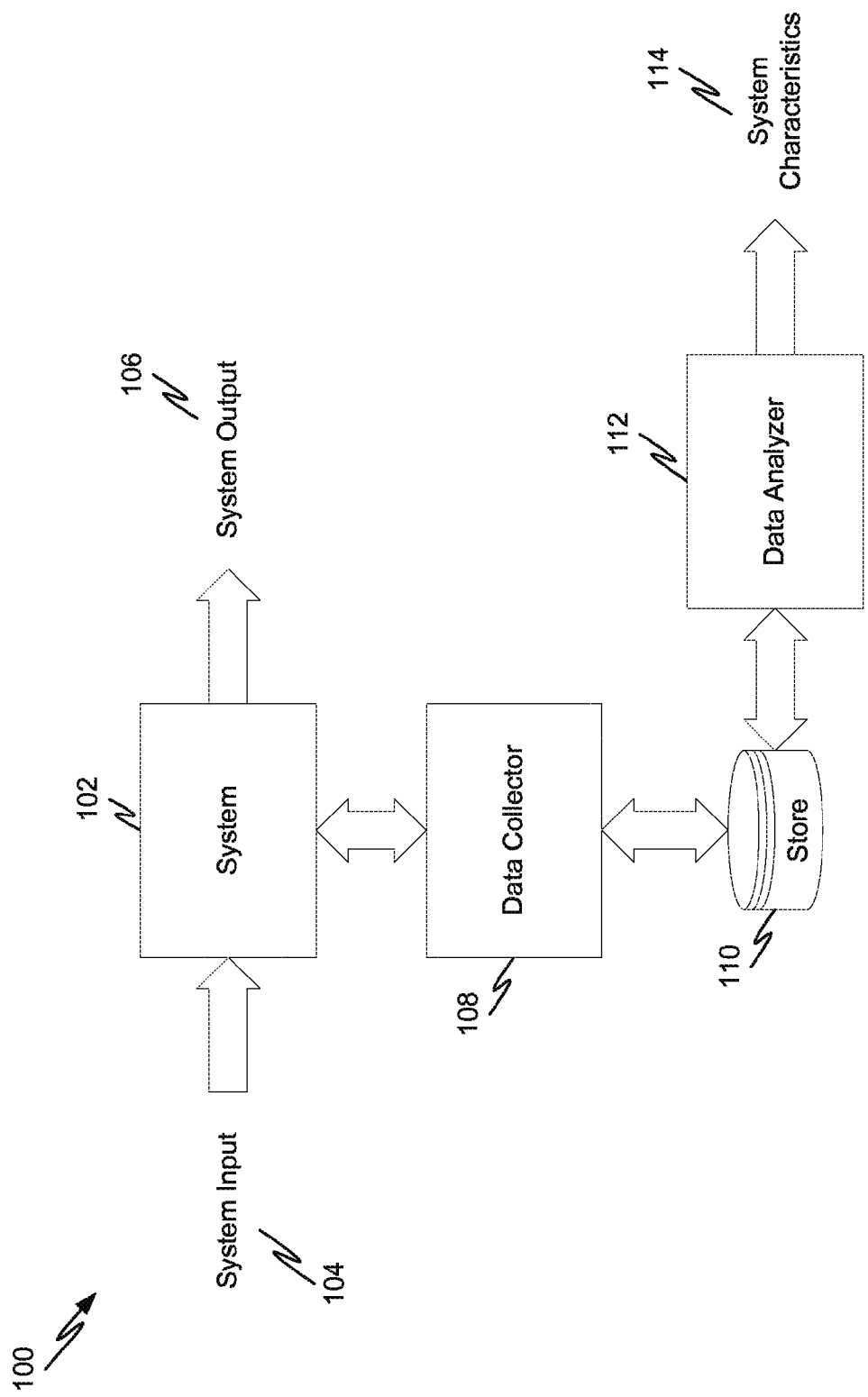
FIG. 1 is a block diagram of a generalized approach to collecting data about a system and analyzing it to extract information about the system.

In the following description, for purposes of explanation, numerous specific details are set forth to provide a thorough understanding of example embodiments. It will be evident to one skilled in the art, however, that the present subject matter may be practiced without these specific details.

Overview

Illustrative embodiments, described in greater detail below, include methods and systems for selecting the top most informative parameters from a data set that may characterize the operation of some real world system. The term "parameter" is sometimes referred to as "fields," "columns," "variables," "predictors," "features" or "inputs," in this disclosure, "parameter" means a type of data element, which typically correlates to some real world type of data that is collected. The data will depend on what type of system is being monitored. For example, in an ecommerce system, parameters may include a user's click stream (e.g., the pages visited and the order they were visited in), the browser used by the user, the number of times different pages/sites were visited, the minimum time spent on a page, the maximum time spent on a page, the products purchased, discounts or promotional codes used, the dollar amounts spent, the location of the user, demographic or other information about the user, and so forth.

The illustrated embodiments select the top most informative parameters while substantially preserving the ability of the new, reduced number of parameters to be interpreted in light of the real world initial data set. In one example, a set of data that characterizes a real world system is obtained. A decision is made as to how many of the top most informative parameters are desired from the data set. The data representing the system is placed in a data matrix with each column representing a parameter and rows representing a different instance of collected data. In a first phase, Missing data may be filled in using a method that does not substantially change the statistics of the data. One method that may be used is based on applying an iterative singular value decomposition mechanism to the input data until the missing values converge to within a desired error.

Once the missing values have been filled in, a second phase then finds the desired reduced set of new parameters by setting up a minimization formulation with appropriate constraints to yield the desired reduced number of parameters while minimizing the reconstruction error. In this situation, reconstruction error represents how well the new reduced set of parameters captures the information of the initial data set. Although various methods may be used to solve the minimization formulation, one example method applies an iterative gradient descent optimization method until the solution converges within the desired error bounds.

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

FIG. 1 is a block diagram 100 of a generalized approach to collecting data about a system 102 and analyzing it to extract information 114 about the system. The system 102 may represent some arbitrarily complex system or collection of systems. In many ways, any particular system or collection of systems may be represented as a "black box" (e.g., system 102) that has a variety of inputs 104 and produces a variety of system outputs or outcomes 106. The notion of "big data" is to collect as much information as possible about the system 102 and then analyze the collected data to characterize how the system inputs 104 yield or influence the system outputs 106. Based on the relationship between system inputs 104 to system outputs 106, decisions may be made about how to adjust some number of system inputs 104 to achieve a desired system output 106.

A data collector 108 may perform the data collection function, for example. Since the amount of data collected is often very large, the data collector 108 may often store the data for later analysis as represented by the data store 110.

Analysis of the data is typically performed by some combination of data analyzers, represented by the data analyzer 112 in FIG. 1. The data analyzer 112 may apply a variety of machine learning algorithms to extract useful information from the collected data. Generally, useful information is information relevant to a particular goal, decision, or question that a user may have. If, for example, the system 102 was a set of intersections surrounding a freeway on-ramp/off-ramp, data may be collected about all the things that influence traffic flow through the intersections. A goal/question/decision about such a system may be "what can be adjusted in order to ensure smooth traffic flow through the intersections at rush hour?" There may be hundreds or thousands of various factors/parameters that influence such a system. Data may be collected about all of these parameters over time to try and capture in the data how the various parameters influence the goal of smooth traffic flow. Analyzing the collected data and identifying the top most informative parameters that influence smooth traffic flow may be an important step to allow machine learning of other effective analysis on the data to determine how traffic flow through the intersections may be smoothed out during rush hour.

From the above example it is apparent that one function of data analyzer 112 may be to reduce the dimensionality of the input data set so that effective analysis and/or decisions may be made about the system. Thus, the output of the data analyzer 112 may be information 114 that characterizes the system. Such characteristic information 114 may include a reduced dimensionality data set that identifies the top N most informative parameters in a data set. Informative parameters are those parameters that capture the majority of the information (variation) in the input parameters. Reducing dimensionality of a data set is discussed below.

Figure 2:
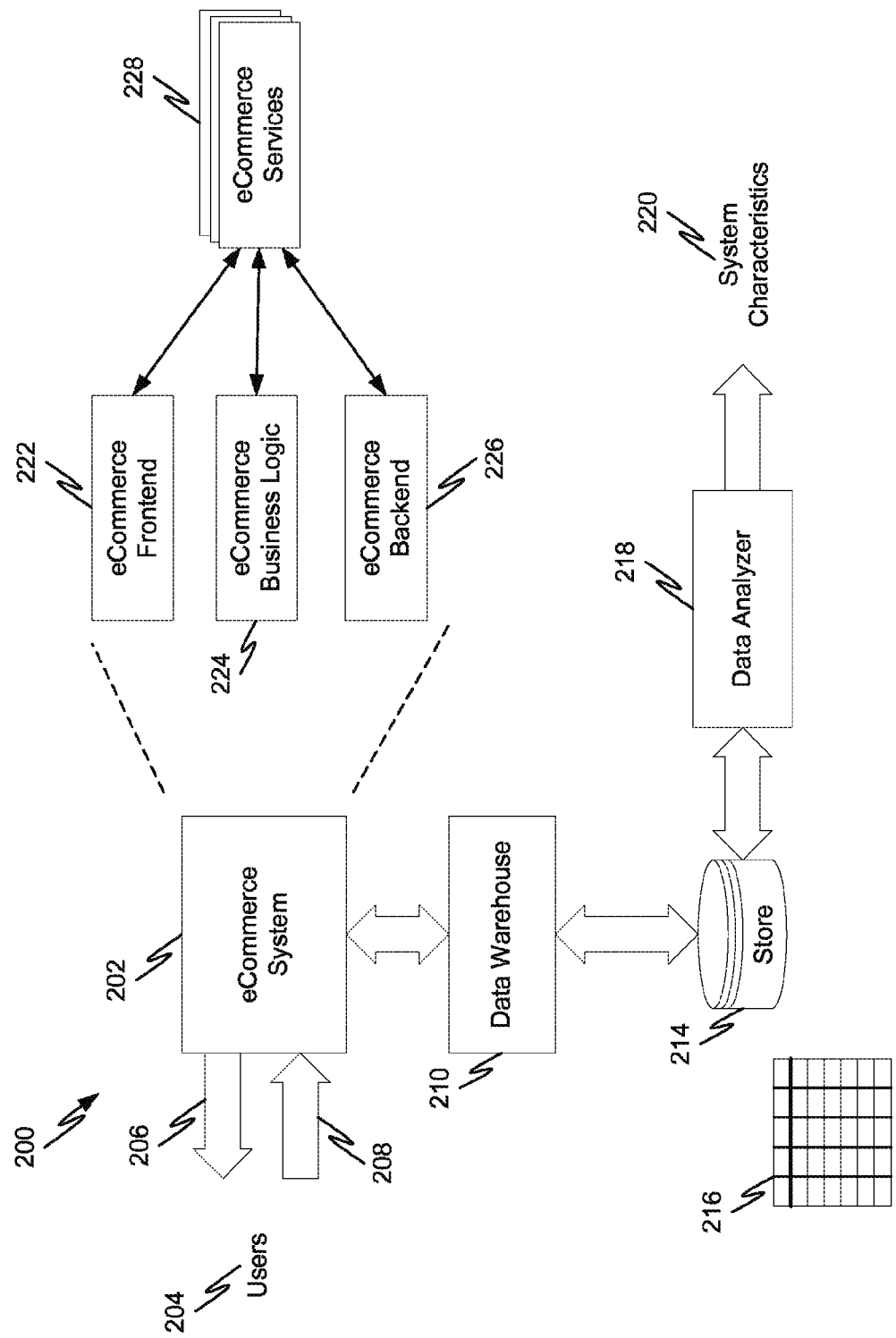
FIG. 2 is a block diagram of an approach to collecting data about an ecommerce system and a user's interaction therewith and analyzing it to extract information.

FIG. 2 is a block diagram 200 of an approach to collecting data about an ecommerce system 202, 222, 224, 226, 228 and a user's interaction therewith 204 and analyzing it to extract information. While, ecommerce systems seem relatively simple, they are in fact quite complex and may involve numerous systems and services all working together to provide a high quality user experience. From the user's perspective, they access a website, browse information, do research, compare products (or whatever else they want), add things to shopping carts, save wish lists, checkout, enter shipping information and so forth. From the provider's perspective, providing the experience involves ecommerce front end systems 222 to provide a web presence as a starting point for users, ecommerce business logic systems 224 to serve web pages, provide the logic needed to support various services, browsing scenarios, and so forth, and ecommerce backend systems 226 to provide data storage for items, descriptions, catalogs, web pages, and so forth. All of these may be supported by a variety of ecommerce services 228 such as shopping cart services, payment processing services, shipping and fulfillment services, online help and chat services, and so forth. Thus, an ecommerce system 202 is really a large collection of systems, logic, services, and so forth all working together to provide a high quality user experience.

Arrows 206 and 208 represent the interactions a user has with the ecommerce system 202. These can include things such as receiving marketing materials, web pages request/response, various activities performed in response to presented information, web pages, dialog boxes, and so forth.

The system 200 of FIG. 2 may also include a data warehouse system 210 to monitor the system and user interactions therewith and gather information to help track users and measure effectiveness of various activities (marketing campaigns, presented opportunities, discounts/promotional opportunities, recommended items, and so forth). Representative data that may be collected by the data warehouse system 210 includes a user's click stream (e.g., the pages visited and the order they were visited in), the browser used by the user, the number of times different pages/sites were visited, the minimum time spent on a page, the maximum time spent on a page, the products purchased, discounts or promotional codes used, the dollar amounts spent, the location of the user, demographic or other information about the user, and so forth. The type of information can run into the hundreds or thousands of columns (each column representing a parameter gathered about the user's interaction with the system). Gathered information may be stored in a data store (or multiple data stores) such as data store 214.

Collected data may be represented as a table 216 where columns represent the various parameters gathered and rows represent different users, visits, sessions, and so forth. As discussed above, the gathered information may be of high dimensionality with hundreds or thousands of columns and rows. The data gathered is often sparse, in that there may be data missing from any given row. For example, if a row shows a single session for a single user and columns include products purchased, dollar amount spent, product pages visited, and help files accessed, if a user visits the cite to do product research but not purchase or purchase a product without prior research, then some of the columns will have missing data, depending on the activities of the user.

The data analyzer 218 may perform a wide variety of analysis to extract useful information. For example, perhaps an ecommerce site owner tracks the time a user visits the site (e.g., visit length). They want to know what they can do to increase visit length. As another example, perhaps the same owner is anticipating that a planned change will increase/decrease certain parameters and they want to know what that will do to their visit length metric.

To perform such analysis, it is often important to reduce the dimensionality of the data down to just a few key parameters that will capture the substantial portion of the information the collected data includes. Put a different way, what are the few key parameters that impact visit length? The task, then, is to sort through the hundreds, if not thousands of different parameters and identify just those few key parameters that impact all output parameters. This is a problem in dimension reduction and also of unsupervised feature selection.

Traditional methods of reducing dimensionality of large data sets rely on projecting the input data set onto a set of new output data parameters that are combinations of the input parameters. Dimensionality is reduced by dropping off combinations of parameters that do not add substantially to the output. Thus, in general, a new variable will be a linear combination of the old variables:

$$y_1 = a_1 x_1 + a_2 x_2 + \ldots + a_n x_n$$

written in matrix form:

$$y = Ax$$

where: y is the vector containing the new parameters;
A is a coefficient matrix; and
x is the vector containing the existing parameters.

Techniques, such as single value decomposition can be used to identify A and even reduce the dimensionality of A. However, when the new parameters are expressed in this fashion, they loose their tie to the real world. For example, if the exiting parameters are number of clicks, average visit count, dollars spent and the new parameter is some fraction of each of these, the ability to interpret the new parameter in terms of things that are happening in the real world (e.g., what does 5 times the number of clicks plus 0.34 times the dollars spent really mean?).

The data analyzer 218 may thus employ techniques (described below) that select the few most informative parameters amongst the original parameters. This type of analysis may be part of the system characteristics 220 produced by the data analyzer 218. The system characteristics 220 may thus be a substantially reduced set of parameters that capture most of the information from the full set of data. In many instances a data set with hundreds, thousands, or tens of thousands of parameters may be reduced down to just a handful of parameters without loosing a substantial amount of information. Often times, the number of selected parameters is less than about ten. The system characteristics 220 may then be used in further ways for various purposes, such as to identify how to increase sales, how to improve traffic flow to the ecommerce system and the like.

The techniques described below to identify the top N most informative parameters have two phases. In the first phase, the selected data set is made complete by filling in any missing data. In the second phase, the N most informative parameters are identified subject to the constraints outlined.

Figure 3:
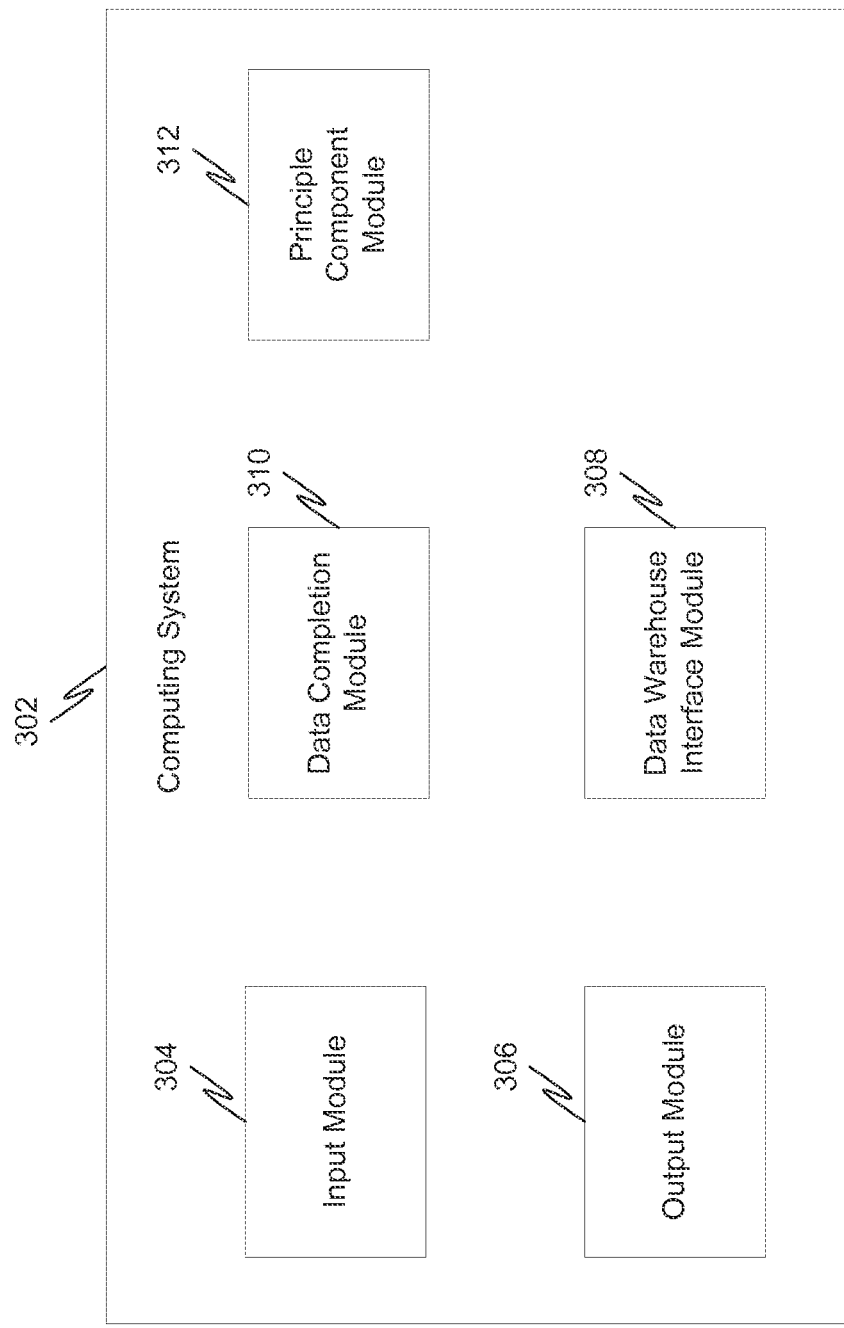
FIG. 3 is a block diagram of an example computing system providing ranking and feature selection of data representing real world aspects of a system.

FIG. 3 is a block diagram of an example computing system 302 providing ranking and feature selection of data representing real world aspects of a system, such as data analyzer 218 of FIG. 2. Computing system 300 may include an input module 304 and an output module 306. These two modules may be responsible for getting information, commands, and so forth into and out of the system, respectively. Thus, the input module 304 may interface with a user, system, or other entity to identify any input parameters needed for the analysis through a variety of mechanisms. In a more remote or automatic mode, the input module 304 may use various mechanisms to connect and interact with other systems and entities. In a more manual mode the input module 304 may receive information via a user's interaction with a user interface, keyboard, mouse, touch, voice and so forth. The input module 304 may also obtaining an input data set that is of interest or is the basis for the requested analysis. The output module 306 provides similar functionality, although directed toward output rather than input. Although shown as two different modules, the input module 304 and output module 306 may be part of the same module or may have or rely on other modules to perform their functions.

The computing system 302 may also include data warehouse interface module 308. This module may also be part of the input module 204 and/or the output module 306. However, it is illustrated separately to indicate that in some embodiments there may be specific ways to interface with a data warehouse system, such as data warehouse system 210 of FIG. 2. If data warehouse system 210 is built upon a database system, data warehouse interface module 308 may include mechanisms for retrieving a desired data set from the database(s) where the data warehouse collected data resides.

The computing system 302 may also include a data completion module 310. As discussed above, a first phase of the analysis may be to do such things and complete the data set by filling in any missing data. A description of a suitable implementation is discussed below. The data completion module 310 may also perform other desired functions to prepare the data for competing the data set or for the second phase such as scaling, centering the data if needed/desired and so forth.

The computing system 302 may also include a principle component module 312. This module may, for example, perform the second phase of the two-phase process described above. The principle component module 312 identifies N most informative parameters while substantially preserving the ability to interpret what they mean in the real world. Another name for such a module could be a ranking and feature selection module. A method to perform the ranking and feature selection is discussed below.

Figure 4:
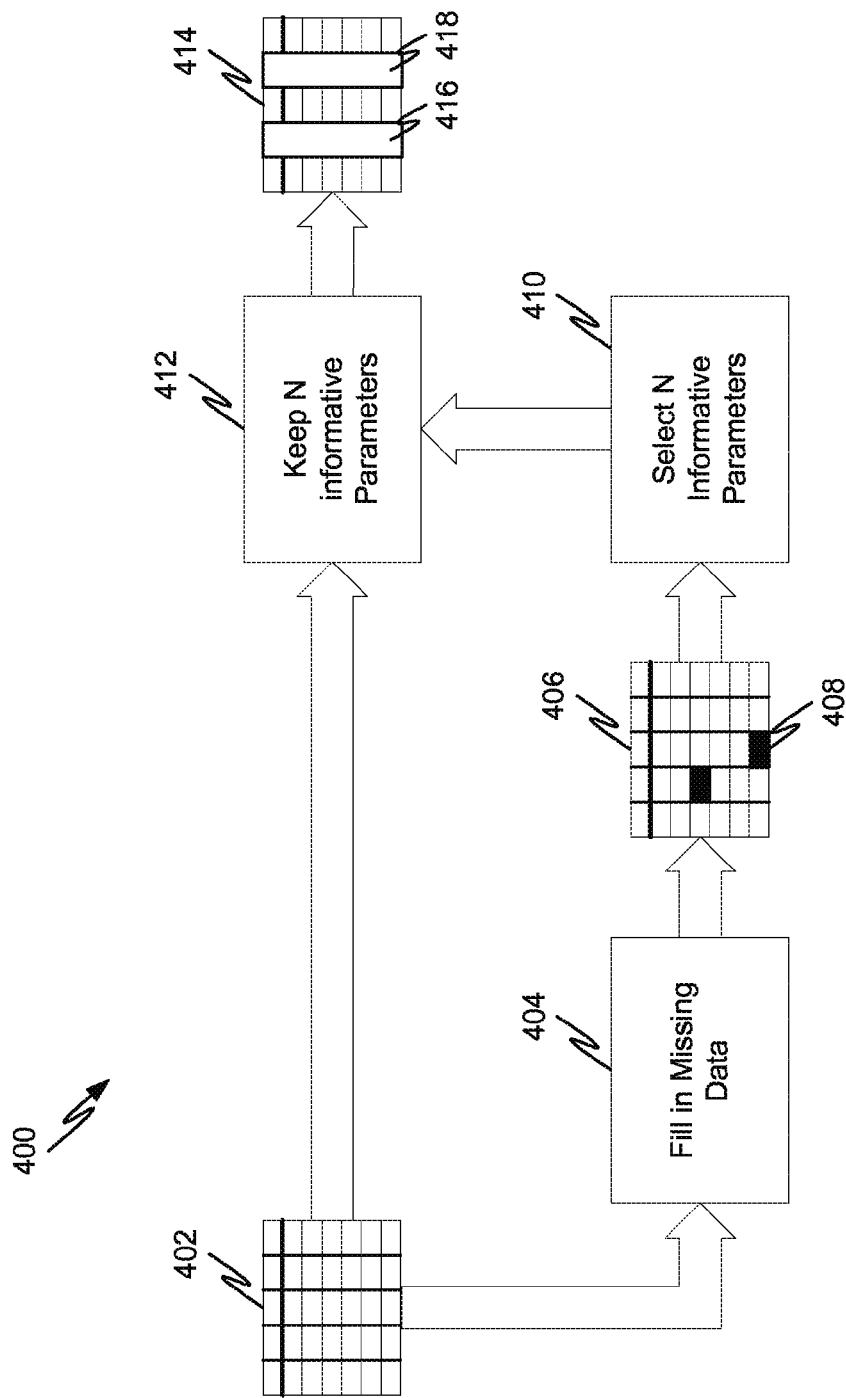
FIG. 4 is a flow diagram illustrating an example system for selecting a set of parameters that represents a reduced dimensionality set of input data.

FIG. 4 is a flow diagram 400 illustrating an example system for selecting a set of parameters that represents a reduced dimensionality set of input data. In other words, the flow diagram 400 takes an input data set 402 and selects the N most informative parameters of the data set and eliminates the remainder. In FIG. 4, the input data set 402 is arranged in a table or matrix for ease of visualization. The input data may come from, for example, a data store, such as the store 214 of FIG. 2 via, for example, the data warehouse interface module 308 of FIG. 3. The input data may be gathered from real world systems and may represent real world activities, system operation, or other such information. The input data may generally comprise numerous parameters, each stored in a column of the input data set 402. Thus, the columns of input data set 402 each represent a measured parameter while each row of the input data set 402 represents a measurement of the parameters in the columns. Table 1 below represents an example of input data set 402. Table 1 comprises a reduced set of data that might be gathered from an ecommerce or other type system where users can view items on web pages, examine the items in further detail, have various advertising campaigns presented to them (either from within the system or via another channel such as email, paper advertising, and so forth), and purchase items or services.

As a user interacts with the system, various metrics may be measured such as the revenue from the user, the number of visits to the system a user makes, the average length of each visit, the average number of pages examined for each visit, the number of times a user "clicks through" from one page to another, the advertising campaign presented to the user (if any), and the number of items a user examines during the visit. In the table below, each column represents a parameter and each row represents a different user.

TABLE 1

Example Input Data Set

| Revenue | Number of Visits | Length of Visit | Number of Pages Visited | Click Through Rate | Advertising Campaign | Number of Items Examined |
|---|---|---|---|---|---|---|
| 0 | 8 | 246 | 8 | 0 | 1 | 2 |
| 0 | 14 | 153 | 14 | 40 | 1 | 4 |
| 0 | 2 | 5 | 2 | 64 | 1 | 0 |
| 0 | 14 | 0 | 0 | 0 | 2 | 0 |
| 0 | 2 | 3 | 2 | 106 | 5 | 0 |
| 124.5 | 9 | 817 | 9 | 0 | 5 | 6 |
| 0 | 2 | 2 | 0 | 0 | 5 | 8 |
| 35.2 | 2 | 3 | 0 | 0 | 0 | 12 |
| 0 | 3 | 0 | 3 | 64 | 0 | 8 |
| 0 | 17 | 0 | 17 | 64 | 0 | 0 |

TABLE 1-continued

Example Input Data Set

| Revenue | Number of Visits | Length of Visit | Number of Pages Visited | Click Through Rate | Advertising Campaign | Number of Items Examined |
|---|---|---|---|---|---|---|
| 0 | 14 | 0 | 14 | 64 | 0 | 0 |
| 0 | 2 | 3 | 7 | 0 | 0 | 0 |
| 0 | 3 | 74 | 0 | 0 | 0 | 4 |
| 0 | 4 | 11 | 0 | 64 | 0 | 9 |
| 0 | 10 | 117 | 0 | 64 | 0 | 10 |
| 0 | 5 | 40 | 5 | 0 | 0 | 0 |
| 0 | 8 | 0 | 8 | 316 | 0 | 0 |
| 0 | 2 | 152 | 2 | 64 | 6 | 0 |
| 104 | 18 | 1183 | 18 | 0 | 5 | 66 |
| 136.46 | 8 | 420 | 8 | 0 | 6 | 0 |
| 0 | 6 | 104 | 6 | 248 | 0 | 16 |
| 0 | 2 | 8 | 2 | 248 | 2 | 3 |
| 0 | 2 | 23 | 2 | 0 | 0 | 8 |
| 0 | 5 | 321 | 5 | 0 | 3 | 2 |

In Table 1, the zeros represent missing data for the parameter. As previously mentioned, the input data set 402 may have hundreds, thousands or more columns, each representing a different parameter. The data in the input data set 402 is often quite sparse, with numerous missing values. With hundreds or even thousands of parameters, not every parameter may be measured at the same time or in response to the same events. This may be one cause for the sparseness of the data in the input data set 402. The identification of the N most informative parameters is done in two phases. In the first phase, any missing data is filled in so the input data set 402 is complete. In the second phase, the completed matrix is examined and the N most informative parameters are identified.

The first phase is represented by operation 404, which fills in the missing data in the input data set 402. The first phase may be accomplished, for example, by data completion module 310 of FIG. 3. Any method may be used by operation 404 to fill in the data as long as the method does not substantially change the statistics of the data in the input data set 402. There are numerous methods known in the art that may accomplish this task. One suitable method is illustrated in conjunction with FIG. 5 below. The complete data set 406 represents the output of operation 404 with missing data, represented by the dark squares 408 filled with data that do not substantially modify the statistics of the data in the input data set 402.

Table 2 is the output of operation 404 as implemented using the method of FIG. 6 below with Table 1 as the input data.

TABLE 2

Example Complete Data Set

| Revenue | Number of Visits | Length of Visit | Number of Pages Visited | Click Through Rate | Advertising Campaign | Number of Items Examined |
|---|---|---|---|---|---|---|
| 103.193 | 8 | 246 | 8 | 112.715 | 1 | 2 |
| 106.835 | 14 | 153 | 14 | 40 | 1 | 4 |
| 95.797 | 2 | 5 | 2 | 64 | 1 | −1.339 |
| 103.874 | 14 | 194.738 | 6.754 | 116.550 | 2 | 8.592 |
| 97.488 | 2 | 3 | 2 | 106 | 5 | 1.102 |
| 124.5 | 9 | 817 | 9 | 106.164 | 5 | 6 |
| 97.105 | 2 | 2 | 4.504 | 120.202 | 5 | 8 |
| 35.2 | 2 | 3 | 0.800 | 120.489 | 0.946 | 12 |
| 94.744 | 3 | 193.627 | 3 | 64 | 3.080 | 8 |
| 111.064 | 17 | 196.017 | 17 | 64 | 3.573 | 4.944 |
| 107.695 | 14 | 195.449 | 14 | 64 | 3.471 | 5.121 |
| 97.046 | 2 | 3 | 2 | 117.940 | 2.809 | 1.867 |
| 98.837 | 3 | 74 | 5.315 | 117.026 | 2.973 | 4 |

TABLE 2-continued

Example Complete Data Set

| Revenue | Number of Visits | Length of Visit | Number of Pages Visited | Click Through Rate | Advertising Campaign | Number of Items Examined |
|---|---|---|---|---|---|---|
| 95.993 | 4 | 11 | 5.129 | 64 | 2.837 | 9 |
| 99.765 | 10 | 117 | 6.351 | 64 | 3.113 | 10 |
| 99.987 | 5 | 40 | 5 | 117.421 | 2.955 | 3.057 |
| 103.922 | 8 | 194.243 | 8 | 316 | 3.136 | 20.978 |
| 95.520 | 2 | 152 | 2 | 64 | 6 | 4.201 |
| 104 | 18 | 1183 | 18 | 126.815 | 5 | 66 |
| 136.46 | 8 | 420 | 8 | 117.720 | 6 | 15.269 |
| 100.800 | 6 | 104 | 6 | 248 | 2.963 | 16 |
| 100.216 | 2 | 8 | 2 | 248 | 2 | 3 |
| 95.006 | 2 | 23 | 2 | 120.092 | 2.777 | 8 |
| 100.526 | 5 | 321 | 5 | 112.041 | 3 | 2 |

The second phase is represented by operation 410, which selects the N most informative parameters from the complete data set 406. Informative parameters are those parameters that capture the majority of the information (variation) in the input parameters. A suitable method to accomplish this operation is illustrated in conjunction with FIG. 5 and FIG. 7 below. N is variable and may be selected in any fashion and may be any desired number. Typically N is substantially less than the number of parameters in the matrix 402. Using Table 2 as the input to the method describe in FIG. 7 yields the results shown in Table 3. As illustrated in this table, the length of visit is the most significant parameter in this data set by a substantial margin. Just selecting the top two or three parameters yields most of the information in the data set and the remainder can be discarded as not carrying significant information.

TABLE 3

Significance of Each Parameter by Rank as a Percentage

| Length of Visit | Click Through Rate | Revenue | Number of Items Examined | Number of Pages Visited | Advertising Campaign | Number of Visits |
|---|---|---|---|---|---|---|
| 94.071 | 5.307 | 0.347 | 0.147 | 0.024 | 2.68e−3 | 1.22e−3 |

Once the N most informative parameters are identified by operation 410, the input matrix 402 may be filtered to keep only those N most informative parameters. The remainder of the data may be discarded. In the example of Table 3 above, perhaps only the top two or three parameters may be kept (e.g., length of visit, click through rate, and revenue). This is illustrated by operation 412, which takes the input matrix 402 and removes those columns that do not contain one of the N most informative parameters. This yields the output matrix 414, where blank columns 416 and 418 illustrate removed columns. The output matrix 414 would typically not preserve blank columns, but they are illustrated in FIG. 4 both for clarity and to illustrate that option. Because N is typically substantially less than the number of parameters in the matrix 402, the dimensionality of the output matrix 414 is typically substantially less than the matrix 402.

Figure 5:
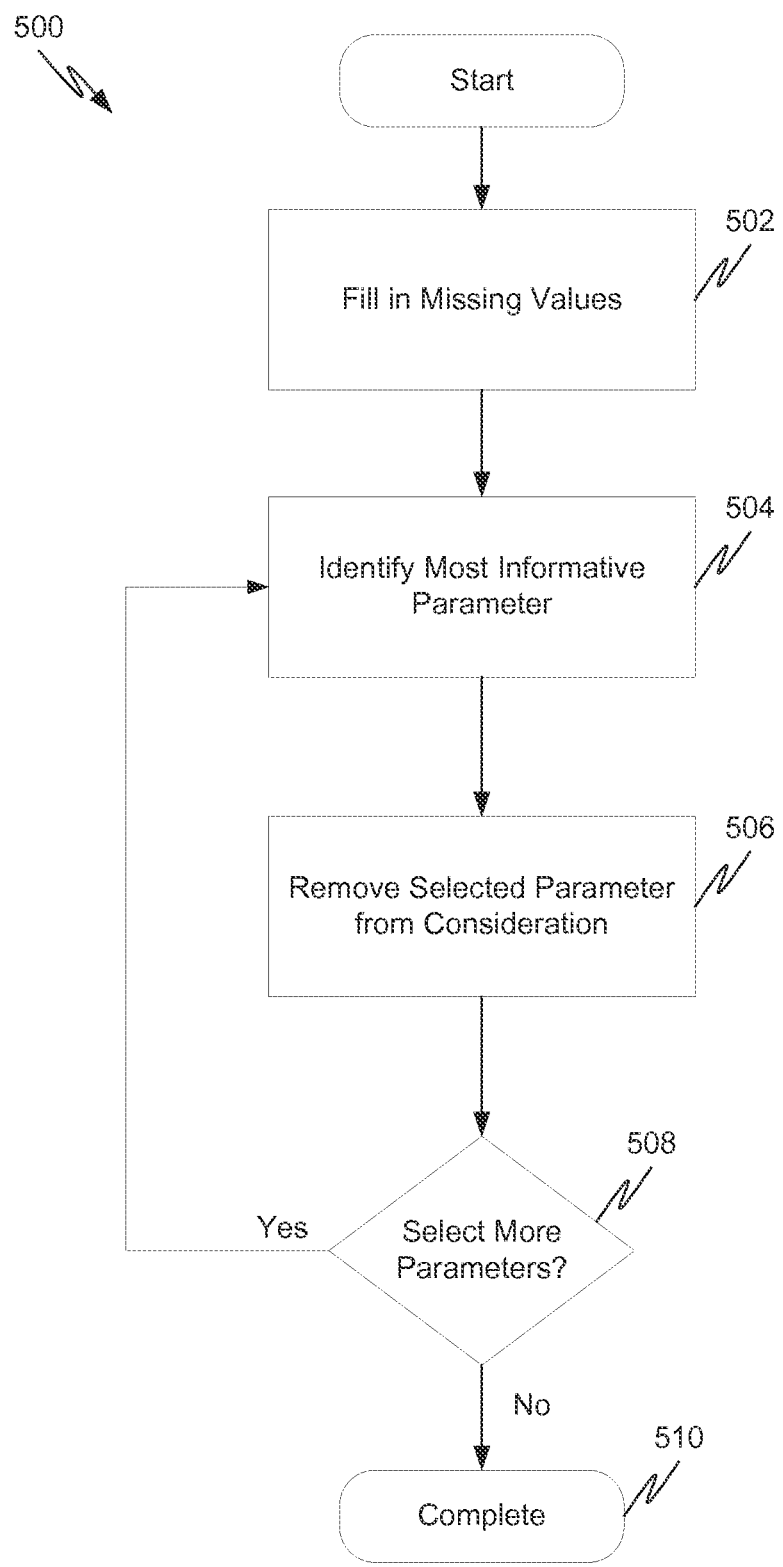
FIG. 5 is a flow diagram illustrating an example method for selecting the N most informative parameters.

FIG. 5 is a flow diagram 500 illustrating the example system of FIG. 4. The flow diagram 500 begins at operation 502 by filling in the missing values of the input data set. This may be accomplished using any method that does not substantially alter the statistics of the input data set. A suitable method is illustrated in FIG. 6 below. Operation 502 represents a first phase of the selection process.

Figure 7:
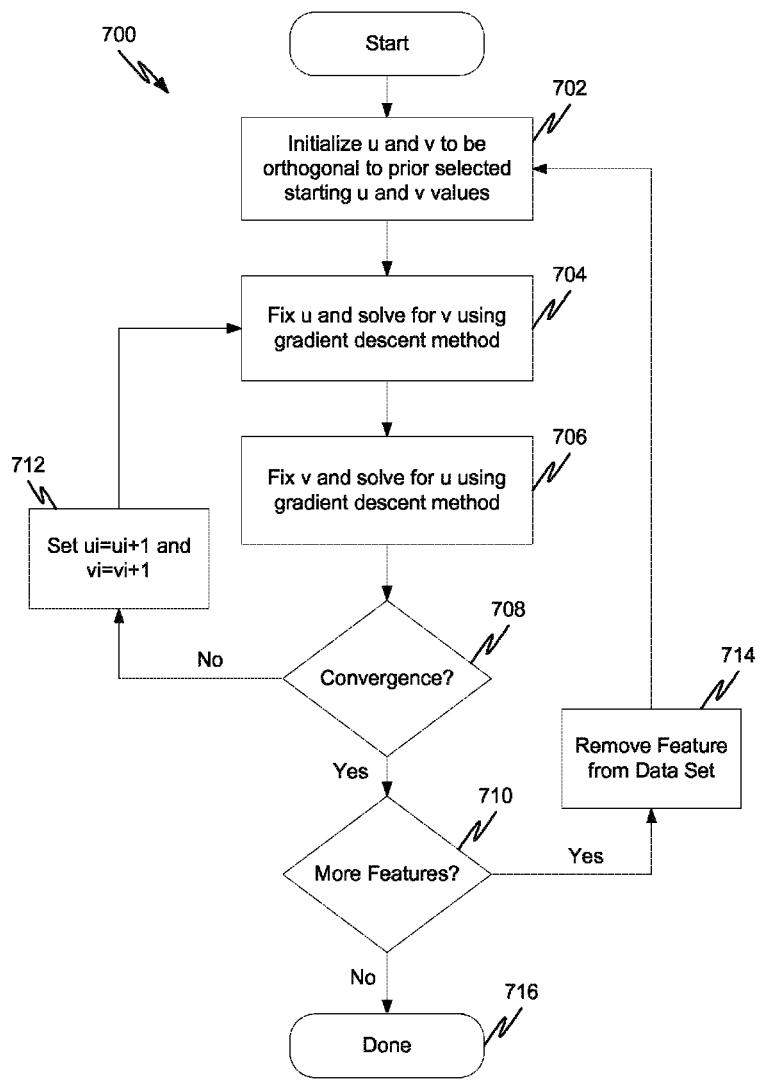
FIG. 7 is a flow diagram illustrating an example method for selecting the N most informative parameters of selection of a data set.

Once any missing values are filled in, the second phase of the selection may proceed. This phase selects the N most informative parameters in the data matrix. The N most informative parameters of the matrix are those parameters that have the highest amount of variation and that are the least correlated to the other selected parameters. In other words, the process selects parameters that have high variation and low correlation to each other. Any suitable method may be used to accomplish this selection. In the flow diagram of FIG. 5, operation 504 selects the next most informative parameter (e.g., the one with the highest variation that has the lowest correlation to any already selected parameters). This may be accomplished by calculating the variation for the remaining parameters and the correlation to the already selected parameters and selecting the parameter that meets the higher variation/lower correlation criteria. Alternatively, the variation and/or correlation may be computed all at once such as when the method of FIG. 5 starts and the method may use the previously calculated variation and correlation to select the appropriate parameter. FIG. 7 also shows a method that may be used to calculate both the variation and correlation simultaneously.

Operation 506 removes the selected parameter from consideration and notes the selected parameter, copies the parameter along with its data to the output data set, or otherwise identifies the selected parameter, along with its order of selection in some embodiments.

Operation 508 determines whether the next most informative parameter should be selected (e.g., the "yes" branch) or whether the desired number of parameters have been selected (e.g., the "no" branch) and the method is complete (operation 510).

Figure 6:
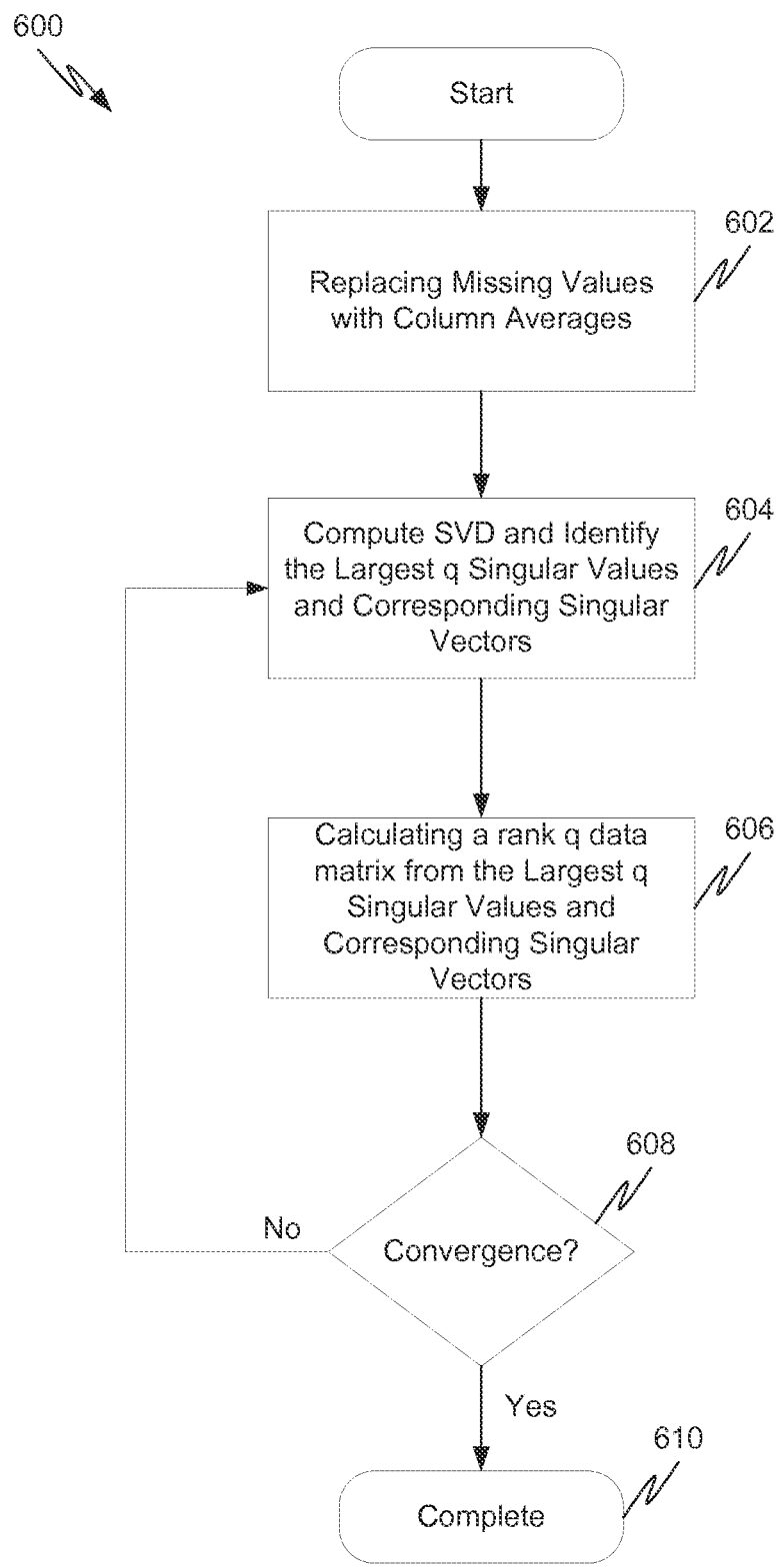
FIG. 6 is a flow diagram illustrating an example method for filling in missing values in data representing real world aspects of a system in preparation for ranking and feature selection.

FIG. 6 is a flow diagram illustrating an example method 600 for filling in missing entries for data representing real world aspects of a system. This may be used, for example, in operation 404 of FIG. 4 and operation 502 of FIG. 5. Although a particular method is illustrated in FIG. 6, any method that fills in the missing data and that does not substantially bias the statistics of the data may be used. The method described in FIG. 6 is based upon information found in the reference: Imputing Missing Data for Gene Expression Arrays (1999) by, Trevor Hastie, Robert Tibshirani, Gavin Sherlock, Michael Eisen, Patrick Brown, David Botstein, which is incorporated herein by reference. This reference also describes other methods to fill in missing data that may be suitable.

In describing the method, matrix notation will be used. Thus, the data to be analyzed may be retrieved and placed in matrix form (or treated as in matrix format for the purposes of the method). In the data matrix, the input parameters will be represented in columns and each row will represent a customer (e.g., an interaction or series of interactions with the system by a particular user). As described above, the data matrix may be sparse and have missing data.

The method below relies on singular value decomposition (SVD) to fill the missing values of the input data. Any m×n matrix (e.g., a matrix containing the data values) may be decomposed into the format:

$$X = UDV^T \quad (1)$$

where: X is the data matrix
U is the left singular vectors (m×n orthogonal matrix with the property that $UU^T = I$)
V is the right singular vectors (n×n orthogonal matrix with the property that $VV^T = I$) and
D is an n×n diagonal matrix where the diagonal coefficients have the property that $d_1 \geq d_2 \geq \ldots \geq d_n \geq 0$.

Operation 602 initializes the process by placing the input data into matrix form with columns representing the various parameters gathered and rows representing the different measurements gathered (e.g., data matrix X) and filling in any missing values with the average value in the column. This will give a starting value for the data matrix (e.g., $X^i$ for i=0).

Operation 604 then computes the SVD of the data matrix (e.g., $X^i$). The SVD may be computed by:

$$\min_{U_q, D_q, V_q} \|X^i - U_q D_q V_q^T\|^2$$

where: q is the numerical rank of the matrix and is chosen such the reduced rank captures a desired amount of the variation in the original values;
$X^i$ is the filled data matrix from the prior iteration; and
$\|M\|^2$ is the Frobenius norm of matrix M.

In one embodiment q is selected such that the selected singular values (and corresponding singular vectors) capture a desired value of the variation in the original values. In one embodiment, q is selected to capture about 90% of the variation in the original values. In other embodiments, q is selected to capture either more or less, depending on how much of the variation is to be captured. The amount of variation captured by selecting q singular values and corresponding singular vectors may be calculated by:

$$\frac{d_1 + d_2 + \cdots + d_q}{d_1 + d_2 + \cdots + d_n} \geq \alpha$$

where: $d_i$ is diagonal coefficient of D;
q defines the singular values being selected;
n is the dimensionality of the data (e.g., the size of D); and
α is the desired threshold (e.g., 0.9 for 90% of variation or whatever is desired).

Operation 606 then computes a rank q data matrix from the largest q singular values and corresponding singular vectors. The rank q data matrix represents the current estimate of data matrix with its missing values (e.g., $X^{i+1}$). The current estimate, $X^{i+1}$, may be calculated using the q-rank of the matrix:

$$X^{i+1} U_q D_q V_q^T$$

where the data beyond rank q is set to zero. The newly computed $X^{i+1}$ identifies new entries for the missing values.

Operation 608 then checks for convergence. Convergence happens when the data matrix estimate does not change by more than a small amount from one iteration to another. This step compares the data matrix to the last estimate and determines how much change is occurring. In one embodiment, convergence may be checked by evaluating $\|X^{i+1} - X^i\|^2 / \|X^i\|^2 \leq \delta$ where δ represents the desired convergence threshold. In one embodiment, δ is chosen to be small, generally on the order of $10^{-8}$. However, in other embodiments, other values of δ may be used. The value need only be in accordance with the desired level of accuracy.

As illustrated by the "no" branch out of operation 608, operations 604 and 606 are repeated until convergence is achieved. Once convergence is achieved to the desired level of accuracy, the method is complete as illustrated by the "yes" branch out of operation 608 and the complete indicator 610.

As discussed above, selecting the N most informative parameters may be accomplished as highlighted in FIG. 5, where the missing input values are filled in (e.g., using the method outlined in FIG. 6) and then identifying the most informative parameters that capture the most variation while having the lowest correlation to other selected parameters. Calculating the variation and correlation among the parameters may be accomplished by calculating at the variance of a column and then calculating the correlation with other columns, such as by treating each column as a vector and calculating the covariance between the two columns. Rather than take this approach, the method of FIG. 7 selects the next most informative parameter each time the method is executed. Thus, the N most informative parameters may be selected by N executions of the method. The method sets up a constrained minimization problem that selects a single input parameter based on the variation and correlation to already selected input parameters.

FIG. 7 is a flow diagram 700 illustrating an example method for that selects the next most informative parameter of an input data set such as might be implemented in operation 410 of FIG. 4, operation 504 of FIG. 5, principle component module 312 of FIG. 2 and/or data analyzer 218 of FIG. 2. The method of FIG. 7 expects the initial data matrix to have missing values filled in. This may be accomplished, for example, using the method of FIG. 6 or another suitable method as previously described. Thus, the method of FIG. 7 may be thought of as a second phase as described in conjunction with the method of FIG. 5.

The illustrated method projects the data matrix (e.g., X) from its present d-dimension space onto a lower dimension space in such a way as to minimize reconstruction error. In other words, the method of FIG. 7 calculates the N most informative parameters in a way that captures the most variation while minimizing the variation that is lost relative to the original data set. The general representation of such a projection may be expressed as:

$$\min \|X - \hat{X}\|^2$$

where: X is the data matrix;
$\hat{X}$ is the data matrix projected onto the lower dimensional space; and
$\|M\|^2$ is the Frobenius norm of matrix M.

By subjecting this general representation to specific constraints, the general representation may be used to select only the most informative parameter of the original set of parameters. By solving the representation multiple times with appropriate starting information, each solution may calculate the next most informative parameter. The next several steps show how the properly constrained problem may be derived. The method using the properly constrained problem is then presented. The constrained optimization problem that computes the parameters of the new space u and v may be expressed as:

$$\underset{(u,v)}{\mathrm{argmin}} \|X - \hat{X}\|^2 \text{ subject to } \begin{cases} \|v\|^2 \leq 1 \text{ and } \|u\|^2 \leq 1 \\ \min\|v\|_0 \text{ and } \min\|u\|_0 \end{cases}$$

where: X is the data matrix;
$\hat{X}$ is the data matrix projected onto the lower dimensional space; and
u and v are the left and right singular vectors, correspondingly.

SVD is the solution to the general optimization problem. The result to the form of the general problem is referred to as the matrix approximation lemma or Eckart-Young-Mirsky. This the most generalized form of the optimization. Rewriting the expression above:

$$\underset{(u,v)}{\mathrm{argmin}} \|X - Xvu^T\|^2 \text{ subject to } \begin{cases} \|v\|^2 \leq 1 \text{ and } \|u\|^2 \leq 1 \\ \min\|v\|_0 \text{ and } \min\|u\|_0 \end{cases}$$

However, some embodiments may simplify the general form for implementation. This may be expressed equivalently as:

$$\underset{(u,v)}{\mathrm{argmin}} \|X - Xvu^T\|^2 \text{ subject to } \begin{cases} \|v\|^2 \leq 1 \text{ and } \|u\|^2 \leq 1 \\ \|v\|_0 \leq \delta \text{ and } \|u\|_0 \leq \eta \end{cases}$$

where: $\eta$ and $\delta$ are thresholds that indicate a desired level of sparsity. In many instances, $\eta$ and $\delta$ are integers.

The form of the expression above has a hi-convexity property in that the expression is convex for v when a is fixed and it is convex for a when v is fixed.

The equation above may be solved using an iterative method, such as that illustrated in FIG. 7. In operation 702, the starting vectors are initialized to be orthogonal to all prior selected initial u and v values. Furthermore, the starting vectors are initialized so that their magnitude is 1. The method described in FIG. 7 results in vector v having one non-zero (or substantially non-zero) value which indicates which is the next most informative parameter. In theory, the vector v will have only one non-zero value while the others will be zero. However, due to rounding, convergence criteria or other such practical aspects, the entries in the vector may be substantially zero (instead of absolutely zero) with one entry that is not substantially zero. This non-zero (or substantially non-zero) value indicates which column of X contains the most informative parameter for this iteration of the method. To select the next most informative parameter, the starting values of $v^i$ and $u^i$ are selected to be orthogonal from those identifying prior informative values selected by the method.

Mathematically, $v^i$ and $u^i$ are initialized so that $\|v^i\|^2 = 1$ and $\|u^i\|^2 = 1$. If this is not the first iteration through the method, then $v^i$ and $u^i$ are selected to be orthogonal from ending $v^{i+1}$ and $u^{i+1}$ from all prior iterations.

In operation 704, u is fixed and the equation (below) is solved for $v^{i+1}$ using a method such as the gradient descent method.

$$\underset{(u,v)}{\mathrm{argmin}} \|X - Xv^{i+1}u^{iT}\|^2 \text{ subject to } \begin{cases} \|v^{i+1}\|^2 \leq 1 \\ \|v^{i+1}\|_0 = 1 \end{cases}$$

The gradient descent method is sometimes referred to as the method of steepest descent or the steepest descent method. The method starts with an initial point and calculates the gradient of the function at that point. The method iteratively steps along the gradient until the minimum is found. The method is well known to those of skill in the art.

From operation 704, $v^{i+1}$ for this iteration is known. Operation 706 next uses $v^{i+1}$ to find $u^{i+1}$ using the gradient descent method. In other words, $v^{i+1}$ is fixed and the equation below is solved for $u^{i+1}$ using a method such as the gradient descent method.

$$\operatorname*{argmin}_{(u,v)} \|X - Xv^{i+1}u^{(i+1)T}\|^2 \text{ subject to } \begin{cases} \|u^{i+1}\|^2 \leq 1 \\ \|u^{i+1}\|_1 \leq 1 \end{cases}$$

Operation 708 checks for convergence to within the desired accuracy. Convergence may be checked by evaluating:

$$\frac{\|u^{i+1} - u^i\|^2}{\|u^i\|^2} \leq \beta \text{ and } \frac{\|v^{i+1} - v^i\|^2}{\|v^i\|^2} \leq \gamma$$

where: β and γ are thresholds that reflect the desired amount of accuracy.

In some embodiments, β and γ are selected to be on the order of $10^{-8}$. However, in other embodiments, other values of β and γ may be used. The values need only be in accordance with the desired level of accuracy. Similarly, although typically the same value is used for both β and γ, they need not be the same value.

If convergence has not yet been satisfactorily reached, the method takes the "no" branch out of operation 708 and the method is repeated starting at operation 704 with $v^{i+1}$ and $u^{i+1}$ being used as $v^i$ and $u^i$ for the next iteration as shown in operation 712.

When convergence is achieved, $v^{i+1}$ will have one non-zero value (or one value that is substantially non-zero while the other values are substantially zero) that will indicate the column of X that contains the most informative parameter identified in this iteration. Thus, the method has selected the most informative parameter and has the characteristic that the parameter is not a combination of the input parameters, but is one of the input parameters itself.

The next most informative parameter may be identified by another iteration of the method. Thus, operation 710 determines whether the next most informative parameter should be identified. If so, the "yes" branch is taken out of operation 710.

Operation 714 removes the currently identified informative parameter. This is done by setting $X=X-\hat{X}$ for the next iteration where $\hat{X}=Xvu^T$ with v and u being the last $v^{i+1}$ and $u^{i+1}$ from operation 608. After this is accomplished, operation 702 is executed, where the initialized values of $v^i$ and $u^i$ in operation 708 are selected to be orthogonal to the last $v^{i+1}$ and $u^{i+1}$ from operation 708 and to any $v^{i+1}$ and $u^{i+1}$ from prior iterations of the method. Thus, to extract N of the most informative parameters, the method will perform N−1 iterations.

If the desired number of informative parameters have been identified, the "no" branch is taken out of operation 710 and the method ends as indicated by done marker 716.

The desired number, N, of most informative parameters may come from any source, either automated or from a user. In general, the number N will be small compared to the dimensionality of the original data, although this is not required as the conditions allow an arbitrary number to be selected. For example, in many instances, the number of parameters desired will be less than about ten.

Once the desired number, N, of the most informative parameters have been identified, the parameters that have not been identified as being one of the top N most informative parameters may be discarded from the original data set as illustrated in FIG. 4 and/or FIG. 5, thus reducing the dimensionality of the data while preserving the information that can be preserved when selecting N parameters from the data set. Since the original parameters are preserved in the output parameters and the output is not a combination of the of the input parameters, the real-world interpretation of the parameters is preserved in the output parameters.

Figure 8:
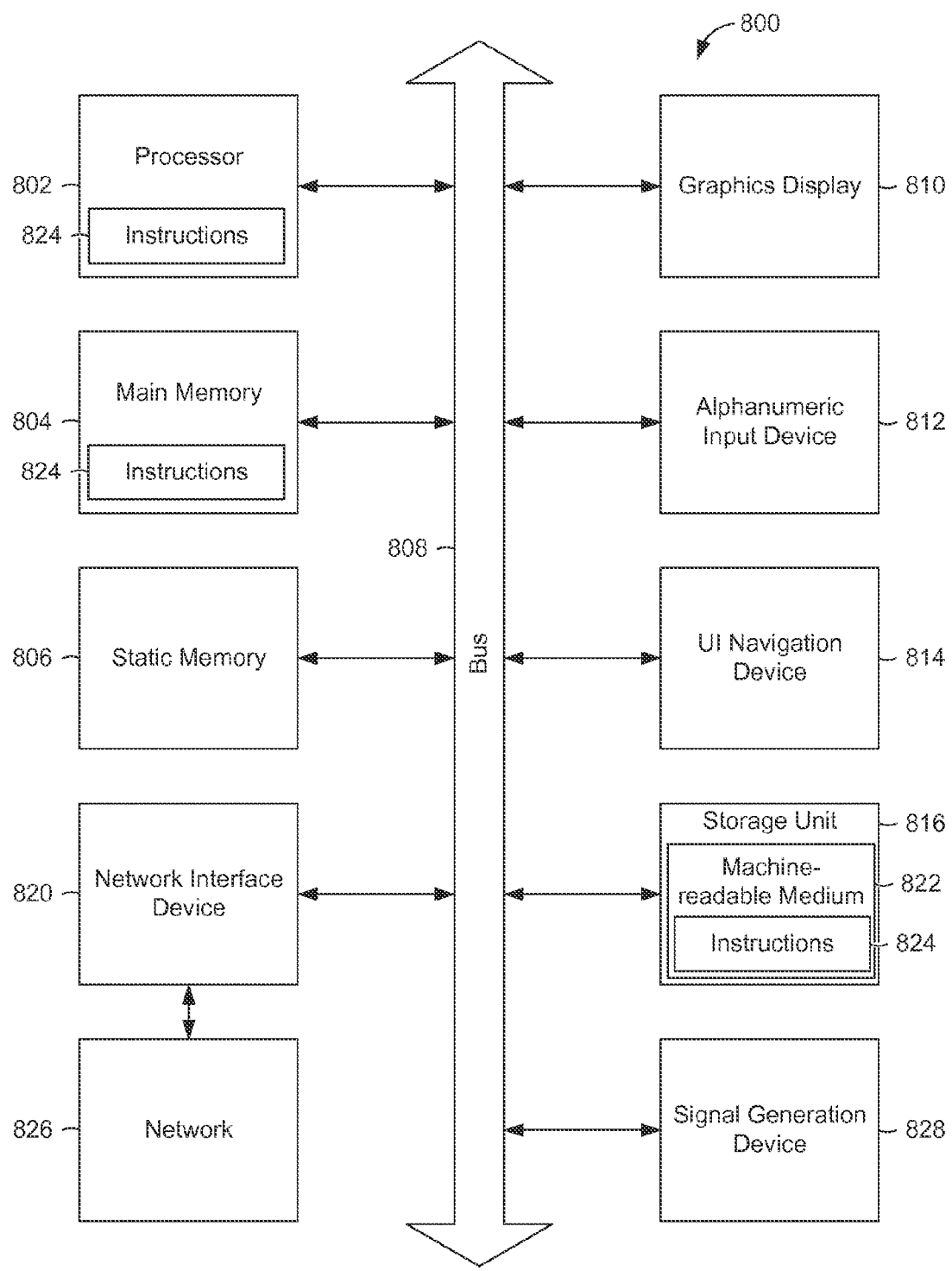
FIG. 8 is a block diagram of a machine in the example form of a processing system within which may be executed a set of instructions for causing the machine to perform any one or more of the methodologies discussed herein including the flow diagrams of FIGS. 4, 5, 6 and 7 and the systems of FIGS. 1-3.

FIG. 8 is a block diagram of a machine in the example form of a processing system 800 within which may be executed a set of instructions 824 for causing the machine to perform any one or more of the methodologies discussed herein including the flow diagrams of FIGS. 4, 5, 6 and 7 and the systems of FIGS. 1-3. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes at least one processor 802 (e.g., a central processing unit (CPU), a graphics processing unit (GPU), advanced processing unit (APU), or combinations thereof), a main memory 804 (e.g., random access memory), and static memory 806 (e.g., static random-access memory), which communicate with each other via bus 808. The processing system 800 may further include graphics display unit 810 (e.g., a plasma display, a liquid crystal display (LCD), a cathode ray tube (CRT), and so forth). The processing system 800 also includes an alphanumeric input device 812 (e.g., a keyboard, touch screen, and so forth), a user interface (UI) navigation device 814 (e.g., a mouse, trackball, touch device, and so forth), a storage unit 816, a signal generation device 828 (e.g., a speaker), and a network interface device 820.

The storage unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804, the static memory 806, and/or within the processor 802 during execution thereof by the processing system 802, with the main memory 804, the static memory 806, and the processor 802 also constituting machine-readable, tangible media.

The data structures and instructions 824 may further be transmitted or received over a computer network 826 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (for example, configured by software), may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed) each of the hardware modules need not be configured or instantiated at any one instance in time. For example, where the hardware modules include a general-purpose processor 802 that is configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (for example, a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine but deployed across a number of machines. In some example embodiments, the processors 802 may be located in a single location (e.g., within a home environment, within an office environment, or as a server farm), while in other embodiments, the processors 802 may be distributed across a number of locations.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to at least one storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof. Machine-readable medium does not include signals per se.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of selecting a desired number of informative data parameters from among a set of data parameters, the method comprising:

obtaining, from a database with a processor, a set of data comprising a plurality of parameters representing a plurality of website metric variables; identifying a desired number of informative parameters to be selected from the plurality of parameters;

creating, by the processor, a complete data set by filling in any missing values in the set of data using a method that does not substantially bias the statistics of the set of data;

selecting, by the processor, a next most informative parameter with a highest variation while having a lowest correlation to a set of previously selected parameters by comparing variation in a non-selected parameter with variation of other non-selected parameters and by evaluating correlation of the non-selected parameter with the set of previously selected parameters;

adding the selected next most informative parameter to the set of previously selected parameters; and repeating the selecting and adding operations until the desired number of informative parameters have been selected.

2. The method of claim 1, wherein the method used to fill the missing values comprises:

(a) producing an initial iteration of the complete data set by setting missing entries in the data set to a mean of the non-missing entries for each column in the data set;

(b) computing the single value decomposition of a current iteration of the complete data set;

(c) selecting the largest q singular values and corresponding singular vectors;

(d) calculating a rank q data matrix from the selected largest q singular values and corresponding singular vectors;

(e) replacing missing values in the data set with corresponding values from the rank q data matrix;

(f) repeating operations (b) through (e) using the rank q data matrix as the current iteration of the complete data set until convergence is achieved.

3. The method of claim 2, wherein q is selected to retain 90% of variation.

4. The method of claim 2, wherein convergence is achieved when the value of $\|X^{i+1}-X^i\|^2/\|X^i\|^2$ is below a threshold that is on the order of $10^{-8}$ and wherein $X^{i+1}$ and $X^i$ are the current iteration and last iteration of the complete data set respectively.

5. The method of claim 1, wherein the next most informative parameter is selected by evaluating an equation of the form $$\operatorname*{argmin}_{(u,v)} \|X - Xvu^T\|^2$$

by a method comprising:

(A) setting $\|v^i\|^2 = \|u^i\|^2 = 1$;

(B) fixing u and solving the equation $\operatorname{argmin}_{(u,v)}\|X - Xv^{i+1}u^{iT}\|^2$ for $v^{i+1}$ with $\|v^{i+1}\|^2 \leq 1$ and $\|v^{i+1}\|_0 = 1$;

(C) using $v^{i+1}$ and solving the equation $\operatorname{argmin}_{(u,v)}\|X - Xv^{i+1}u^{(i+1)T}\|^2$ for $u^{i+1}$ with $\|u^{i+1}\|^2 \leq 1$ and $\|u^{i+1}\|_1 \leq 1$;

(D) repeating operations (B) and (C) until convergence, where convergence is tested by $\|u^{i+1}-u^i\|^2/\|u^i\|^2 \leq \beta$ and $\|v^{i+1}-v^i\|^2/\|v^i\|^2 \leq \gamma$ and wherein $\beta$ and $\gamma$ are on the order of $10^{-8}$.

6. The method of claim 5, further comprising setting $X = X - Xv^{i+1}u^{(i+1)T}$ where $v^{i+1}$ and $u^{i+1}$ are from operation (D) and restarting at operation (A).

7. The method of claim 6 further comprising ensuring $v^i$ and $u^i$ are orthogonal to previous initially selected $v^i$ and $u^i$ prior to restarting the operation at (A).

8. The method of claim 1 further comprising retaining the set of previously selected parameters from the set of input data and discarding remainder of the set of input data.

9. A system comprising:

memory;

a processor operably connected to the memory;

executable instructions stored in the memory that when executed by the processor comprise modules comprising:

a data warehouse interface module comprising programmed logic to receive, via a connection to at least one data store, a set of data comprising a plurality of parameters, each having a real world correspondence;

a data completion module comprising programmed logic executed by the processor to:

examine the set of data to identify missing values; and fill any missing values using a method that captures a desired level of variation of the statistics of the data matrix to produce a complete data matrix;

a principle component module comprising programmed logic executed by the processor to:

select a next most informative parameter with a highest variation while having a lowest correlation to a set of previously selected parameters based on variation of a non-selected parameter and correlation of the non-selected parameter to the set of previously selected parameters;

add the selected next most informative parameter to the set of previously selected parameters; and repeat the select and add operation until the desired number of informative parameters have been selected.

10. The system of claim 9, wherein the data completion module fills any missing data using programmed logic executed by the processor to:

(a) produce an initial iteration of the complete data set by setting missing entries in the data set to a mean of the non-missing entries for each column in the data set;

(b) compute the single v decomposition of a current iteration of the complete data set;

(c) select the largest q singular values and corresponding singular vectors;

(d) calculate a rank q data matrix from the selected largest q singular values and corresponding singular vectors;

(e) replace missing values in the data set with corresponding values from the rank q data matrix;

(f) repeat operations (b) through (e) using the rank q data matrix as the current iteration of the complete data set until convergence is achieved.

11. The system of claim 10, wherein q is selected to retain 90% of variation.

12. The system of claim 10, wherein convergence is achieved when the value of $\|X^{i+1}-X^i\|^2/\|X^i\|^2$ is below a threshold that is on the order of $10^{-8}$ and wherein and $X^{i+1}$ and $X^i$ are the current iteration and last iteration of the complete data set respectively.

13. The system of claim 9, wherein the next most informative parameter is selected by evaluating an equation of the form $$\operatorname*{argmin}_{(u,v)} \|X - Xvu^T\|^2$$

using programmed logic executed by the processor to:

(A) set $\|v^i\|^2 = \|u^i\|^2 = 1$;

(B) fix u and solve the equation $\operatorname{argmin}_{(u,v)}\|X - Xv^{i+1}u^{iT}\|^2$ for $v^{i+1}$ with $\|v^{i+1}\|^2 \leq 1$ and $\|v^{i+1}\|_0 = 1$;

(C) use $v^{i+1}$ and solve the equation $\operatorname{argmin}_{(u,v)}\|X - Xv^{i+1}u^{(i+1)T}\|^2$ for $u^{i+1}$ with $\|u^{i+1}\|^2 \leq 1$ and $\|u^{i+1}\|_1 \leq 1$;

(D) repeat operations (B) and (C) until convergence, where convergence is tested by $\|u^{i+1}-u^i\|^2/\|u^i\|^2 \le \beta$ and $\|v^{i+1}-v^i\|^2/\|v^i\|^2 \le \gamma$ and wherein $\beta$ and $\gamma$ are on the order of $10^{-8}$.

14. The system of claim 13 wherein the programmed logic executed by the processor further comprises set $X=X-Xv^{i+1}u^{(i+1)T}$ where $v^{i+1}$ and $u^{i+1}$ are from operation (D) and restart at operation (A).

15. The system of claim 14 wherein the programmed logic executed by the processor further comprises ensure $v^i$ and $u^i$ are orthogonal to previous initially selected $v^i$ and $u^i$ prior to restarting the operation at (A).

16. The system of claim 9 wherein the programmed logic of the principle component module further comprises retain the set of previously selected parameters from the set of input data and discard the remainder of the set of input data.

17. A non-transitory computer readable storage media having executable instructions encoded thereon that, when executed, cause the system to perform a method comprising:
obtaining, from a database with a processor, a set of data comprising a plurality of parameters representing a plurality of website metric variables;
identifying a desired number of informative parameters to be selected from the plurality of parameters;
creating, by the processor, a complete data set by filling in any missing values in the set of data using a method that does not substantially bias the statistics of the set of data;
selecting, by the processor, a next most informative parameter with a highest variation while having a lowest correlation to a set of previously selected parameters by comparing variation in a non-selected parameter with variation of other non-selected parameters and by evaluating correlation of the non-selected parameter with the set of previously selected parameters;
adding the selected next most informative parameter to the set of previously selected parameters; and
repeating the selecting and adding operations until the desired number of informative parameters have been selected.

18. The computer readable storage media of claim 17, wherein the method used to fill the missing values comprises:
(a) producing an initial iteration of the complete data set by setting missing entries in the data set to a mean of the non-missing entries for each column in the data set;
(b) computing the single value decomposition of a current iteration of the complete data set;
(c) selecting the largest q singular values and corresponding singular vectors;
(d) calculating a rank q data matrix from the selected largest q singular values and corresponding singular vectors;
(e) replacing missing values in the data set with corresponding values from the rank q data matrix;
(f) repeating operations (b) through (e) using the rank q data matrix as the current iteration of the complete data set until convergence is achieved.

19. The computer readable storage media of claim 17, wherein the next most informative parameter is selected by evaluating an equation of the form $$\mathop{\mathrm{argmin}}_{(u,v)} \|X - Xvu^T\|^2$$

by a method comprising:
(A) setting $\|v^i\|^2=\|u^i\|^2=1$;
(B) fixing u and solving the equation $\mathrm{argmin}_{(u,v)}\|X-Xv^{i+1}u^{iT}\|^2$ for $v^{i+1}$ with $\|v^{i+1}\|^2 \le 1$ and $\|v^{i+1}\|_0=1$;
(C) using $v^{i+1}$ and solving the equation $\mathrm{argmin}_{(u,v)}\|X-Xv^{i+1}u^{(i+1)T}\|^2$ for $u^{i+1}$ with $\|u^{i+1}\|^2 \le 1$ and $\|u^{i+1}\|_1 \le 1$;
(D) repeating operations (B) and (C) until convergence, where convergence is tested by $\|u^{i+1}-u^i\|^2/\|u^i\|^2 \le \beta$ and $\|v^{i+1}-v^i\|^2/\|v^i\|^2 \le \gamma$ and wherein $\beta$ and $\gamma$ are on the order of $10^{-8}$.

20. The computer readable storage media of claim 19, further comprising setting $X=X-Xv^{i+1}u^{(i+1)T}$ where $v^{i+1}$ and $u^{i+1}$ are from operation (D) and restarting at operation (A).

* * * * *